US012699404B2

(12) United States Patent
Moser

(10) Patent No.: US 12,699,404 B2
(45) Date of Patent: Aug. 4, 2026

(54) SYSTEMS AND METHODS FOR CONTROLLING A VEHICLE BY TELEOPERATION BASED ON A SPEED LIMITER

(71) Applicant: Kodiak Robotics, Inc., Mountain View, CA (US)

(72) Inventor: Albert N. Moser, Mountain View, CA (US)

(73) Assignee: Kodiak Robotics, Inc., Mountain View, CA (US)

( * ) Notice: Subject to any disclaimer, the term of this patent is extended or adjusted under 35 U.S.C. 154(b) by 186 days.

(21) Appl. No.: 17/818,372

(22) Filed: Aug. 9, 2022

(65) Prior Publication Data

US 2024/0053742 A1    Feb. 15, 2024

(51) Int. Cl.
| | |
|---|---|
| *G05D 1/65* | (2024.01) |
| *B60W 60/00* | (2020.01) |
| *G05D 1/227* | (2024.01) |
| *G05D 1/85* | (2024.01) |

(52) U.S. Cl.
CPC ............. *G05D 1/65* (2024.01); *B60W 60/001* (2020.02); *G05D 1/227* (2024.01); *G05D 1/857* (2024.01); *B60W 2520/10* (2013.01); *B60W 2555/60* (2020.02); *B60W 2710/18* (2013.01); *B60W 2720/106* (2013.01)

(58) Field of Classification Search
CPC ....... G05D 1/0011–005; G05D 1/0061; G05D 1/0066; G05D 1/0223; G05D 1/0297; G05D 1/221–2279; G05D 1/65; G05D 1/6987; G05D 1/83; G05D 1/85; G05D 1/857; B60W 60/001; B60W 60/0015–00188; B60W 60/0025; B60W 60/005; B60W 60/007; B60W 2510/0604; B60W 2510/0609; B60W 2520/10; B60W 2520/105; B60W 2540/10–12; B60W 2555/60; B60W 2710/0605; B60W 2710/0611; B60W 2710/18; B60W 2720/10; B60W 2720/103; B60W 2720/106

See application file for complete search history.

(56) References Cited

U.S. PATENT DOCUMENTS

| | | | |
|---|---|---|---|
| 2002/0016653 A1* | 2/2002 | Levine | ..................... B60T 7/12 701/1 |
| 2022/0283579 A1* | 9/2022 | Hu | ....................... G05D 1/0011 |

\* cited by examiner

*Primary Examiner* — Spencer D Patton
(74) *Attorney, Agent, or Firm* — Fox Rothschild LLP

(57) ABSTRACT

This disclosure provides systems and methods for controlling a vehicle by teleoperation based on a speed limiter. The method may include: receiving, at the autonomous vehicle, a teleoperation input from a teleoperation system, wherein the teleoperation input comprises a throttle control input for remotely controlling a speed of the autonomous vehicle; determining the speed of the autonomous vehicle; determining if the speed of the autonomous vehicle has reached a threshold speed below a speed limit; and upon determining that the speed of the autonomous vehicle has reached the threshold speed, reducing effect of the throttle control input from the teleoperation system such that an acceleration rate of the speed of the autonomous vehicle is reduced.

18 Claims, 7 Drawing Sheets

Teleop Longitudinal Control

FIG. 2B

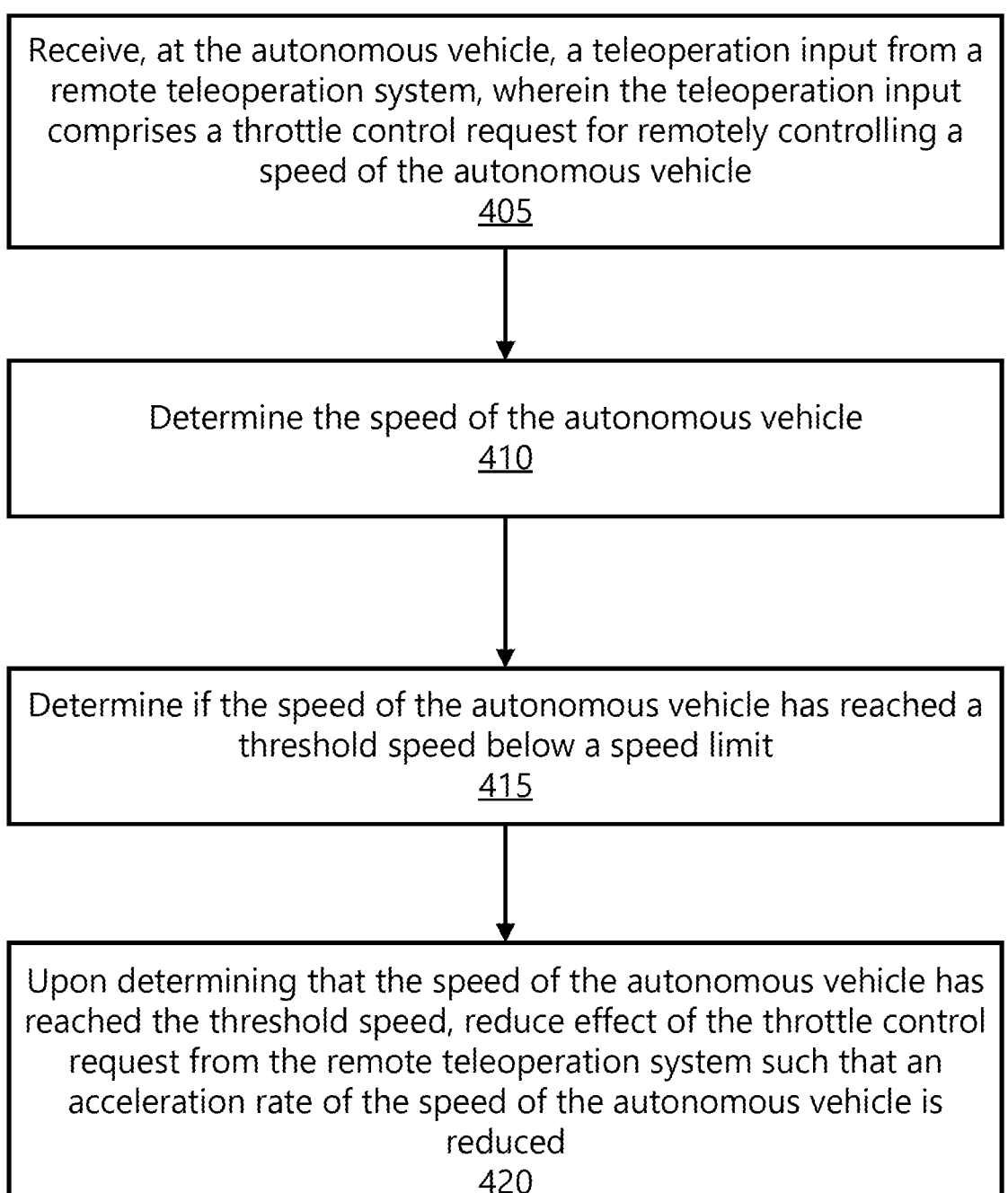

400

Receive, at the autonomous vehicle, a teleoperation input from a
remote teleoperation system, wherein the teleoperation input
comprises a throttle control request for remotely controlling a
speed of the autonomous vehicle
405

Determine the speed of the autonomous vehicle
410

Determine if the speed of the autonomous vehicle has reached a
threshold speed below a speed limit
415

Upon determining that the speed of the autonomous vehicle has
reached the threshold speed, reduce effect of the throttle control
request from the remote teleoperation system such that an
acceleration rate of the speed of the autonomous vehicle is
reduced
420

FIG. 4

SYSTEMS AND METHODS FOR CONTROLLING A VEHICLE BY TELEOPERATION BASED ON A SPEED LIMITER

FIELD

This disclosure relates generally to systems and methods for controlling a vehicle by teleoperation based on a speed limiter.

BACKGROUND

Autonomous vehicles refer to vehicles that replace human drivers with sensors, computer-implemented intelligence, and other automation technology. Autonomous vehicles can be used to aid in the transport of passengers or items from one location to another. Such vehicles may operate in a fully autonomous mode where passengers may provide some initial input, such as a pickup or destination location, and the vehicle maneuvers itself to that location. While doing so, the safety of the passengers and the vehicle is an important consideration. For example, a vehicle traveling on a road of a road network according to a route to a destination may encounter events along the route that pose safety concerns. In such circumstances, an autonomous vehicle autonomously traveling along the route and encountering such events may require teleoperators' intervention.

Therefore, there is a need for effective systems and methods for controlling an autonomous vehicle by teleoperations.

SUMMARY

This disclosure addresses the above need in a number of aspects. In one aspect, this disclosure provides a method of controlling an autonomous vehicle. In some embodiments, the method comprises: receiving, at the autonomous vehicle, a teleoperation input from a teleoperation system, wherein the teleoperation input comprises a throttle control input for remotely controlling a speed of the autonomous vehicle; and using a processor: (a) determining the speed of the autonomous vehicle; (b) determining if the speed of the autonomous vehicle has reached a threshold speed below a speed limit; and (c) upon determining that the speed of the autonomous vehicle has reached the threshold speed, reducing effect of the throttle control input from the teleoperation system such that an acceleration rate of the speed of the autonomous vehicle is reduced.

In some embodiments, the method comprises determining the speed of the autonomous vehicle by a speedometer. In some embodiments, the autonomous vehicle may have a failed inertial measurement unit (IMU). In some embodiments, the method comprises determining the speed of the autonomous vehicle without the IMU.

In some embodiments, the step of reducing the effect of the throttle control input from the teleoperation system may be independent of cruise control.

In some embodiments, the threshold speed may be a speed that is 5 mph to 10 mph below the speed limit. In some embodiments, the speed limit may be from 30 mph to 40 mph.

In some embodiments, the teleoperation input may be entered by a teleoperator through the teleoperation system. In some embodiments, the teleoperation input may be entered by the teleoperator through a throttle control pedal.

In some embodiments, the step of receiving the teleoperation input may be in response to a teleoperation event.

In some embodiments, the teleoperation input comprises a brake pedal input or an engine brake input.

In some embodiments, the method comprises receiving at the autonomous vehicle the teleoperation input from the teleoperation system through a wireless communication link.

In another aspect, this disclosure provides a system for controlling an autonomous vehicle. In some embodiments, the system comprises: a teleoperation receiver, configured to receive a teleoperation input from a teleoperation system, wherein the teleoperation input comprises a throttle control input for remotely controlling a speed of the autonomous vehicle; and a processor, configured to: (a) determine the speed of the autonomous vehicle; (b) determine if the speed of the autonomous vehicle has reached a threshold speed below a speed limit; and (c) upon determining that the speed of the autonomous vehicle has reached the threshold speed, reduce effect of the throttle control input from the teleoperation system such that an acceleration rate of the speed of the autonomous vehicle is reduced.

In some embodiments, the processor may be configured to determine the speed of the autonomous vehicle by a speedometer. In some embodiments, the autonomous vehicle may have a failed inertial measurement unit (IMU). In some embodiments, the processor may be configured to reduce effect of the throttle control input from the teleoperation system independent of cruise control.

In some embodiments, the threshold speed may be a speed that is 5 mph to 10 mph below the speed limit. In some embodiments, the speed limit may be from 30 mph to 40 mph.

In some embodiments, the teleoperation input may be entered by a teleoperator through the teleoperation system. In some embodiments, the teleoperation input may be entered by the teleoperator through a throttle control pedal.

In some embodiments, the step of receiving the teleoperation input may be in response to a teleoperation event.

In some embodiments, the teleoperation input comprises a brake pedal input or an engine brake input.

In some embodiments, the processor may be configured to receive at the autonomous vehicle the teleoperation input from the teleoperation system through a wireless communication link.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIG. 2B shows an example teleoperation longitudinal control logic for controlling an autonomous vehicle through teleoperations.

FIG. 4 shows an example method for controlling an autonomous vehicle, according to various embodiments of the present disclosure.

DETAILED DESCRIPTION

Figure 1:
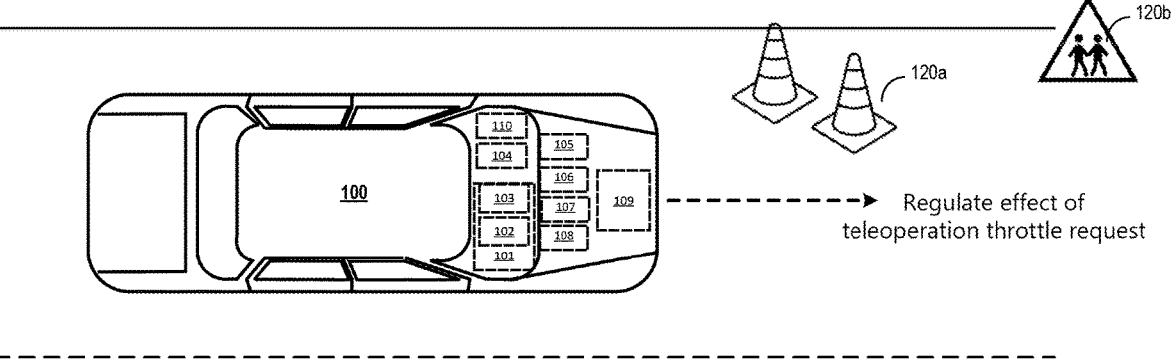
FIG. 1 shows an example method for controlling an autonomous vehicle by regulating the effect of a throttle control input, according to various embodiments of the present disclosure.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. These terms are merely intended to distinguish one component from another component, and the terms do not limit the nature, sequence or order of the constituent components.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements.

In addition, the terms "unit," "-er," "-or," and "module" described in the specification mean units for processing at least one function and operation, and can be implemented by hardware components or software components and combinations thereof.

In this document, when terms such as "first" and "second" are used to modify a noun, such use is simply intended to distinguish one item from another, and is not intended to require a sequential order unless specifically stated.

In addition, terms of relative position such as "vertical" and "horizontal," or "front" and "rear," when used, are intended to be relative to each other and need not be absolute, and only refer to one possible position of the device associated with those terms depending on the device's orientation.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility,"

and the like each refer to a non-transitory device on which computer-readable data, programming instructions or both are stored. Except where specifically stated otherwise, the terms "memory," "memory device," "computer-readable storage medium," "data store," "data storage facility," and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The terms "instructions" and "programs" may be used interchangeably herein. The instructions may be stored in object code format for direct processing by the processor, or in any other computing device language, including scripts or collections of independent source code modules that are interpreted on demand or compiled in advance. Functions, methods, and routines of the instructions are explained in more detail below. The instructions may be any set of instructions to be executed directly (such as machine code) or indirectly (such as scripts) by the processor. For example, the instructions may be stored as computing device code on the computing device-readable medium.

The term "data" may be retrieved, stored or modified by processors in accordance with a set of instructions. For instance, although the claimed subject matter is not limited by any particular data structure, the data may be stored in computing device registers, in a relational database as a table having a plurality of different fields and records, XML documents or flat files. The data may also be formatted in any computing device-readable format.

The term "module" or "unit" refers to a set of computer-readable programming instructions, as executed by a processor, that cause the processor to perform a specified function.

The term "vehicle," or other similar terms, refers to any motor vehicles, powered by any suitable power source, capable of transporting one or more passengers and/or cargo. The term "vehicle" includes, but is not limited to, autonomous vehicles (i.e., vehicles not requiring a human operator and/or requiring limited operation by a human operator), automobiles (e.g., cars, trucks, sports utility vehicles, vans, buses, commercial vehicles, etc.), boats, drones, trains, and the like.

The term "autonomous vehicle," "automated vehicle," "AV," or "driverless vehicle," as used herein, refers to a vehicle capable of implementing at least one navigational change without driver input. A "navigational change" refers to a change in one or more of steering, braking, or acceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints), but may leave other aspects to the driver (e.g., braking). In some cases, autonomous vehicles may handle some or all aspects of braking, speed control, and/or steering of the vehicle.

The term "teleoperation" is used broadly to include, for example, any instruction, guidance, command, request, order, directive, or other control of or interaction with an autonomous driving capability of an autonomous vehicle, sent to the autonomous vehicle or the autonomous vehicle system by a communication channel (e.g., wireless or wired). The term "teleoperation command" is used interchangeably with "teleoperation." Teleoperations are examples of interventions.

The term "teleoperator" is used broadly to include, for example, any person or any software process or hardware device or any combination of them that initiates, causes, or is otherwise the source of a teleoperation. A teleoperator may be local to the autonomous vehicle or autonomous vehicle system (e.g., occupying the autonomous vehicle, standing next to the autonomous vehicle, or), or remote from the autonomous vehicle or autonomous vehicle system (e.g., at least 1, 2, 3, 4, 5, 10, 20, 30, 40, 50, 100, 200, 300, 400, 500, 600, 700, 900, or 1000 kilometers away from the autonomous vehicle).

The term "teleoperation event" is used broadly to include, for example, any occurrence, act, circumstance, incident, or other situation for which a teleoperation would be appropriate, useful, desirable, or necessary.

The term "teleoperation request" is used broadly to include, for example, any communication from an autonomous vehicle or an autonomous vehicle system to a teleoperator or other part of a teleoperation system in connection with a teleoperation. The teleoperation request may comprise one or more of the following: relevant information about an autonomous vehicle system failure or other condition, autonomous vehicle system information and data, the teleoperation event, important features, currently active teleoperation events, one or more teleoperations, and data of the autonomous vehicle system associated with each active teleoperation event.

The term "teleoperation input" is used broadly to include, for example, any communication from a teleoperator or other part of a teleoperation system to an autonomous vehicle or an autonomous vehicle system in connection with a teleoperation.

The term "trajectory" is used broadly to include, for example, a motion plan or any path or route from one place to another; for instance, a path from a pickup location to a drop-off location.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules, and the processor is specifically configured to execute said modules to perform one or more processes which are described further below.

Further, the control logic of the present disclosure may be embodied as non-transitory computer-readable media on a computer-readable medium containing executable programming instructions executed by a processor, controller, or the like. Non-limiting examples of computer-readable media include, but are not limited to, ROM, RAM, compact disc (CD)-ROMs, magnetic tapes, floppy disks, flash drives, smart cards, and optical data storage devices. The computer-readable medium can also be distributed in network-coupled computer systems so that the computer-readable media may be stored and executed in a distributed fashion such as, e.g., by a telematics server or a Controller Area Network (CAN).

Unless specifically stated or obvious from context, as used herein, the term "about" is understood as within a range of normal tolerance in the art, for example, within two standard deviations of the mean. About can be understood as within 10%, 9%, 8%, 7%, 6%, 5%, 4%, 3%, 2%, 1%, 0.5%, 0.1%, 0.05%, or 0.01% of the stated value.

Hereinafter, systems and methods for controlling a vehicle in response to an abnormal condition, according to embodiments of the present disclosure, will be described with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

With reference to FIG. 1, autonomous vehicles, e.g., an autonomous vehicle 100, are required to bring goods or passengers to desired locations safely. There must be a high degree of confidence that autonomous vehicles will not collide with objects or obstacles in an environment of the autonomous vehicle 100. However, during transit on a road along a route between two places, the autonomous vehicle 100 may encounter a teleoperation event that requires intervention by a teleoperator through a teleoperation system. The teleoperation event may include a hardware or software failure/fault of one or more components of the autonomous vehicle 100 or an event or a road condition, e.g., 120a and 120b, that interrupts normal driving procedures, such as events that are either unpredictable in nature, pose safety concerns, or require responses to spontaneous visual cues or direction, such as hand signals provided by a police officer or a construction worker directing traffic.

However, when operating the autonomous vehicle 100 remotely, it is important to limit the speed of the autonomous vehicle 100 in consideration of the teleoperation event, such as the hardware or software failure. Unlike the existing methods that rely on a fully functional real time control feedback loop and hardware (e.g., inertial measurement unit (IMU), cruise control system), the disclosed methods and systems regulate the speed of the autonomous vehicle 100 by reducing the effect of a throttle request from the teleoperator. Notably, the disclosed methods and systems only require speed signals from a speedometer which is generally more reliable than an IMU. The process is required to reduce the speed of the autonomous vehicle 100, but will decrease the rate of acceleration of the autonomous vehicle 100, thus reducing the chance of going over a predetermined speed limit.

Accordingly, this disclosure is generally directed to methods and systems for controlling the autonomous vehicle 100 by regulating the effects or responsiveness of a teleoperation input. The disclosed methods and systems allow the autonomous vehicle 100 to receive a teleoperation input from a teleoperator in response to a teleoperation event, such as a hardware or software failure. The teleoperation input may include a throttle control input. However, since the teleoperator will be remotely controlling the autonomous vehicle 100, the speed of the autonomous vehicle 100 should be kept at a safe range below or around a predetermined speed limit (e.g., 50 mph, 45 mph, 40 mph, 35 mph, 30 mph, 25 mph, 20 mph). To that end, the autonomous vehicle 100 will determine the current speed of the autonomous vehicle 100 based on, e.g., signals from a speedometer. When the current speed of the autonomous vehicle 100 reaches a threshold speed below a predetermined speed limit, it will reduce effects or responsiveness of a teleoperation input from a teleoperator so as to decrease the rate of acceleration of the autonomous vehicle 100 and reduce the chance of going over a predetermined speed limit. According to various embodiments, the threshold speed below a predetermined speed limit may be a speed that is about 2 to 10 mph (e.g., 2 mph, 3 mph, 4 mph, 5 mph, 6 mph, 7 mph, 8 mph, 9 mph, 10 mph) below a predetermined speed limit.

FIG. 1 also shows an example of a control system-equipped autonomous vehicle 100, in accordance with various embodiments of the present disclosure. The autonomous vehicle 100 may be any type of vehicle including, but not limited to, cars, trucks, motorcycles, busses, recreational vehicles, agricultural vehicles, construction vehicles etc. According to various embodiments, the autonomous vehicle 100 may include a throttle control system 105, a braking system 106, a speedometer 107, and a speed limiter 108. According to various embodiments, the autonomous vehicle 100 may include one or more engines 109 and/or one or more computing devices 101. The one or more computing devices 101 may be separate from the automated throttle control system 105 or the braking system 106. According to various embodiments, the computing device 101 may include a processor 102 and/or a memory 103. The memory 103 may be configured to store programming instructions that, when executed by the processor 102, are configured to cause the processor 102 to perform one or more tasks. In some embodiments, the autonomous vehicle 100 may include one or more sensors 110 for sensing or measuring properties of an environment of the autonomous vehicle 100. For example, such sensors may include, but are not limited to: LIDAR, RADAR, cameras, monocular or stereo video cameras in the visible light, infrared and/or thermal spectra; ultrasonic sensors, time-of-flight (TOF) depth sensors, speed sensors, temperature sensors, and rain sensors. In some embodiments, the autonomous vehicle 100 may include a receiver 104 configured to process the communication between the autonomous vehicle 100 and a teleoperation system.

Figure 2A:
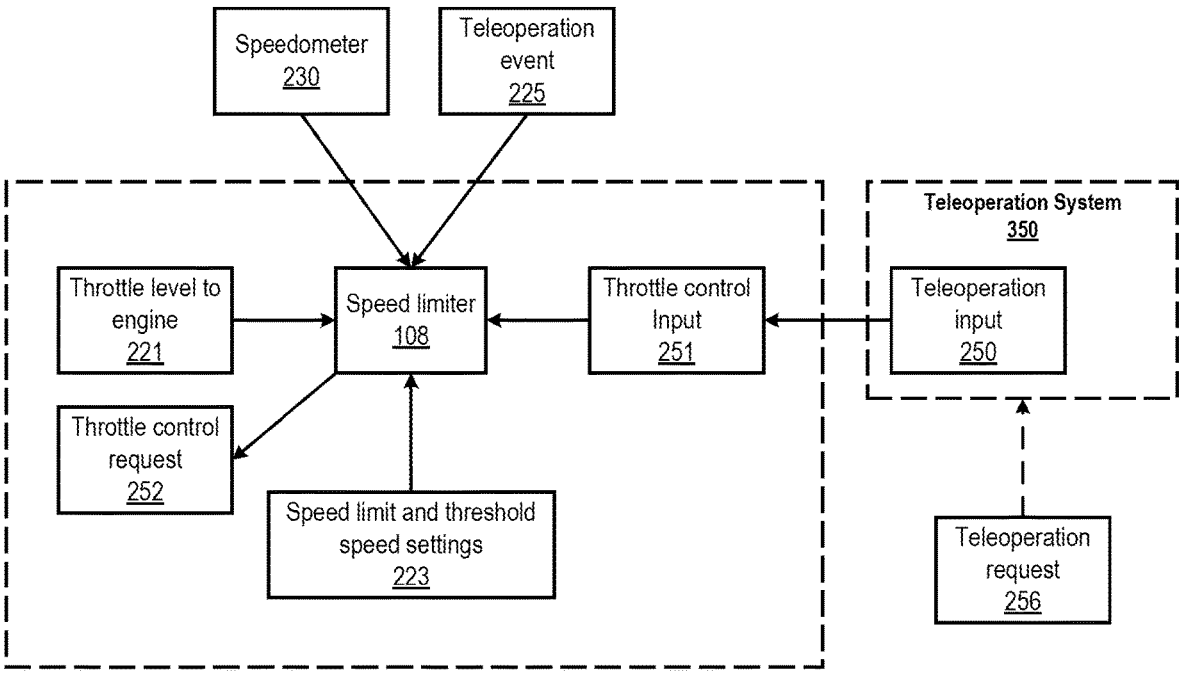
FIG. 2A shows an example process for controlling an autonomous vehicle through teleoperations based on a speed limiter, according to various embodiments of the present disclosure.

Referring now to FIG. 2A, an example implementation of the disclosed methods and systems for controlling the autonomous vehicle 100 through a teleoperation based on a speed limiter is depicted, in accordance with various embodiments of the present disclosure. In the event the autonomous vehicle 100 encounters a teleoperation event 225 including an event or a road condition, e.g., 120a and 120b, or a hardware or software failure or fault of one or more components of the autonomous vehicle 100 that may interrupt nominal driving procedures, a teleoperator may intervene in operation of a planner of the autonomous vehicle 100 through a teleoperation system.

According to various embodiments, a teleoperation event 225 may be triggered upon an even or a request. Non-limiting examples of the event or request may include: a detour, a protest, a fire, an accident, a flood, a fallen tree or rock, a medical emergency, a police request, a request by an occupant in the autonomous vehicle 100, a request by a user of the autonomous vehicle 100, or initiation by a teleoperator, or combinations of them. For example, a teleoperation event 225 may include one or more outputs from hardware components or software processes of the autonomous vehicle 100, e.g., video streams from a camera, signals of a sensor (e.g., LIDAR, and a radar), tracked objects from a perception system, dynamic quantities (e.g., velocity and orientation) of the autonomous vehicle 100, throttle levels, brake levels, or a trajectory identified by a motion planning process, or combinations of them.

A teleoperation event 225 may also include a status of hardware components and or software processes of the autonomous vehicle 100, e.g., a failure in sensor operations, a heavy load in a motion planning process, a long queue, or a long time in a decision-making process. The status information may be used for determining an applicable teleoperation. A teleoperation event 225 may also include the absence or presence of certain data from the autonomous vehicle 100 or from other data sources or both, such as map data, sensor data, connectivity data, GPS data, infrastructure data, or vehicle-to-vehicle data. A teleoperation event 225 may include a hazardous condition (e.g., a fire, a flat tire, a bomb) in the autonomous vehicle 100 or in the environment of the autonomous vehicle 100. A teleoperation event 225 may include known facts regarding the autonomous vehicle 100 or the environment of the autonomous vehicle 100. Non-limiting examples may include: any objects perceived in the past or current environment of the autonomous vehicle 100; any past, current or future travel rules; any past, current or future trajectories; a construction zone; and a lane shift. A teleoperation event 225 may further include unrecognizable matters. Non-limiting examples may include: a detected object in the past or current environment of the autonomous vehicle 100 cannot be recognized by the autonomous vehicle 100; any past, current or future travel rules cannot be interpreted by the autonomous vehicle 100; any past, current or future trajectories cannot be planned; and an interference (e.g., a construction zone and a detour) on a road segment.

According to various embodiments, the autonomous vehicle 100 may send a teleoperation request 256 to the teleoperation system 350. When the teleoperation request 256 arrives at the teleoperation system 350, the teleoperation system 350 may place the teleoperation request 256 in a queue to allocate an available teleoperator (e.g., human teleoperator). Alternatively and/or optionally, the teleoperator may initiate teleoperation without a teleoperation request 256 having been generated.

The teleoperator may enter a teleoperation input 250 containing, e.g., a steering wheel angle and/or throttle pedal/brake commands through the teleoperation system in response to a teleoperation event 225. According to various embodiments, the teleoperation input 250 may include a throttle control input 251. The throttle control input 251 may include a desired throttle level or throttle position requested by a teleoperator. The teleoperation system 350 may transmit the teleoperation input to a speed limiter 108 of the autonomous vehicle 100, e.g., through a wireless communication link.

However, as mentioned above, since the teleoperator is not onboard the autonomous vehicle 100, the teleoperator may not have a direct sense of the environment of the autonomous vehicle 100 and may request an inappropriate level of the throttle. Thus, there is a good chance that the autonomous vehicle 100 may accelerate too fast and exceed a predetermined speed limit, which would pose a serious safety concern, especially under the circumstances of the teleoperation event 225.

Thus, to keep the speed of the autonomous vehicle 100 a safe range below or around a predetermined speed limit, the autonomous vehicle 100 will determine the current speed of the autonomous vehicle 100 based on, e.g., signals from a speedometer 230. When the current speed of the autonomous vehicle 100 reaches a threshold speed below a predetermined speed limit, it will reduce effects or responsiveness of a teleoperation input from a teleoperator so as to decrease the rate of acceleration of the autonomous vehicle 100 and thus reduce the chance of going over a predetermined speed limit. According to various embodiments, the speed limit and the threshold speed below the speed limit can be predetermined values based on speed limit and threshold speed settings 223. For example, a predetermined speed limit can be 20 to 50 mph (e.g., 20 mph, 25 mph, 30 mph, 35 mph, 40 mph, 45 mph, 50 mph). A threshold speed may be a speed that is about 2 to 10 mph (e.g., 2 mph, 3 mph, 4 mph, 5 mph, 6 mph, 7 mph, 8 mph, 9 mph, 10 mph) below the predetermined speed limit.

In addition, upon receipt of the throttle control input 251 from a teleoperator, the speed limiter 108 may determine a suitable throttle level based on one or more of the nature of the teleoperation event 225, the current speed of the autonomous vehicle 100, the predetermined speed limit and threshold speed 223, and the current throttle level 221. The throttle control input 251 may include a desired throttle level or throttle position requested by a teleoperator. According to various embodiments, a suitable throttle level is at least 0%, at least 10%, at least 20%, at least 30%, at least 40%, at least 50%, at least 60%, at least 70%, at least 90%, at least 95% of the normal throttle level associated with the throttle control input 251. In some embodiments, a suitable throttle level is at least 10% of the normal throttle level associated with the throttle control input 251. In some embodiments, a suitable throttle level is at least 20% of the normal throttle level associated with the throttle control input 251. In some embodiments, a suitable throttle level is at least 30% of the normal throttle level associated with the throttle control input 251. In some embodiments, a suitable throttle level is at least 40% of the normal throttle level associated with the throttle control input 251. In some embodiments, a suitable throttle level is at least 50% of the normal throttle level associated with the throttle control input 251. In some embodiments, a suitable throttle level is at least 60% of the normal throttle level associated with the throttle control input 251. In some embodiments, a suitable throttle level is at least 70% of the normal throttle level associated with the throttle control input 251. In some embodiments, a suitable throttle level is at least 80% of the normal throttle level associated with the throttle control input 251. In some embodiments, a suitable throttle level is at least 90% of the normal throttle level associated with the throttle control input 251. In some embodiments, a suitable throttle level is at least 95% of the normal throttle level associated with the throttle control input 251. Once the speed limiter determines a suitable throttle level, it may generate a throttle control request 252 with the suitable throttle level 251.

Figure 2B:
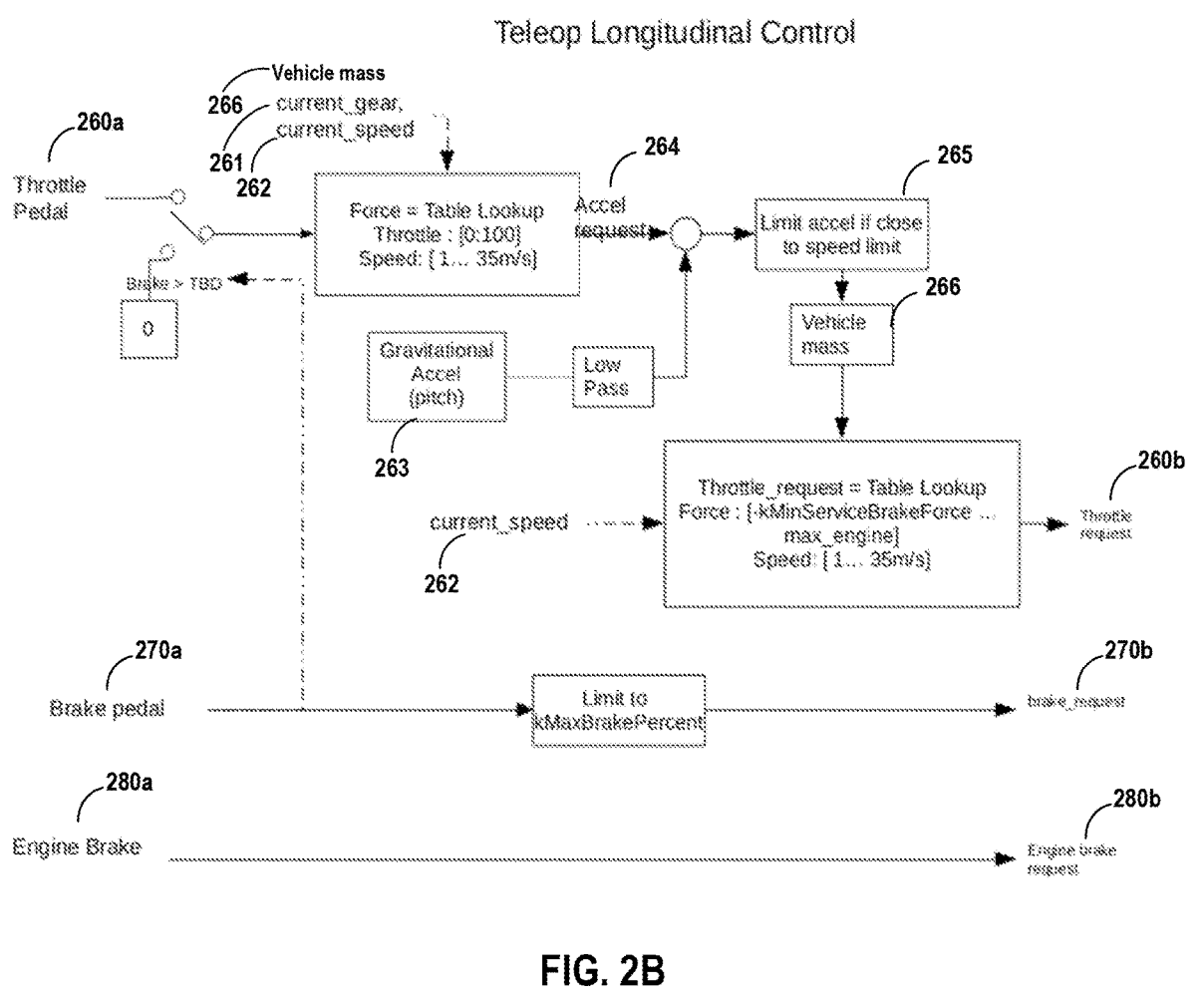

Referring now to FIG. 2B, an example implementation of the disclosed methods for controlling the autonomous vehicle 100 through teleoperations based on a speed limiter is depicted, in accordance with various embodiments of the present disclosure. When a remote teleoperator presses on a throttle pedal 260a through a teleoperation system, the teleoperation system may generate a teleoperation request containing a throttle control input and send it to the speed limiter of the autonomous vehicle 100. The throttle control input may include a desired level or position of the throttle a teleoperator requested. According to various embodiments, based on the current gear 261, the current speed 262, and/or vehicle mass 266, the throttle control input may be converted into an acceleration request 264, which corresponds to a desired acceleration rate of the teleoperator. However, if the current speed of the autonomous vehicle 100 has reached the threshold speed (e.g., 30 mph) below a predetermined speed limit (e.g., 35 mph), the speed limiter may reduce and/or limit the acceleration rate 265 of the autonomous vehicle 100. In reducing and/or limiting the acceleration rate, the speed limiter may dynamically determine a suitable acceleration rate of the autonomous vehicle 100 by taking into account the current speed 261, the current gear 262, the gravitational position 263 of the autonomous vehicle 100 (e.g., driving uphill or downhill direction), and vehicle mass 266. For example, if the autonomous vehicle 100 is driving in a downhill direction, the speed limiter may further reduce the acceleration rate of the autonomous vehicle 100 as compared to the autonomous vehicle 100 driving on a flat road. Conversely, if the autonomous vehicle 100 is driving in an uphill direction, the speed limiter may only slightly reduce or may not reduce the acceleration rate of the autonomous vehicle 100 as compared to the autonomous vehicle 100 driving on a flat road. Based on the determined suitable acceleration rate, the speed limiter may generate a throttle control request 260b to the engine. According to various embodiments, a throttle control request 260b may be converted into an acceleration request based on one or more parameters, including vehicle mass 266.

According to various embodiments, in addition to a throttle control input, a teleoperation input may include a brake pedal input 270a and/or an engine brake input 280b from a teleoperator through the teleoperation system, in the event that deceleration of the autonomous vehicle 100 through a service brake and/or an engine brake is necessary. The brake pedal input 270a may include a desired level or position of the brake as requested by the teleoperator. Once the brake pedal input 270a is received at the autonomous vehicle 100, the autonomous vehicle 100 may disengage or override the throttle control request 260b and stop ongoing acceleration of the autonomous vehicle 100. Subsequently, the autonomous vehicle 100 may generate a brake control request 270b according to the brake pedal input 270a.

Similarly, the engine brake input 280a may include a desired level or position of the engine brake as requested by the teleoperator. The desired level or position of the engine brake may depend on the proportion of engine braking used to achieve target deceleration. Once the engine brake input 280a is received at the autonomous vehicle 100, the autonomous vehicle 100 may disengage or override the throttle control request 260b and stop ongoing acceleration of the autonomous vehicle 100. According to various embodiments, an engine brake input 280a may be used to achieve target deceleration independently of or together with a brake pedal input 270a.

Figure 3:
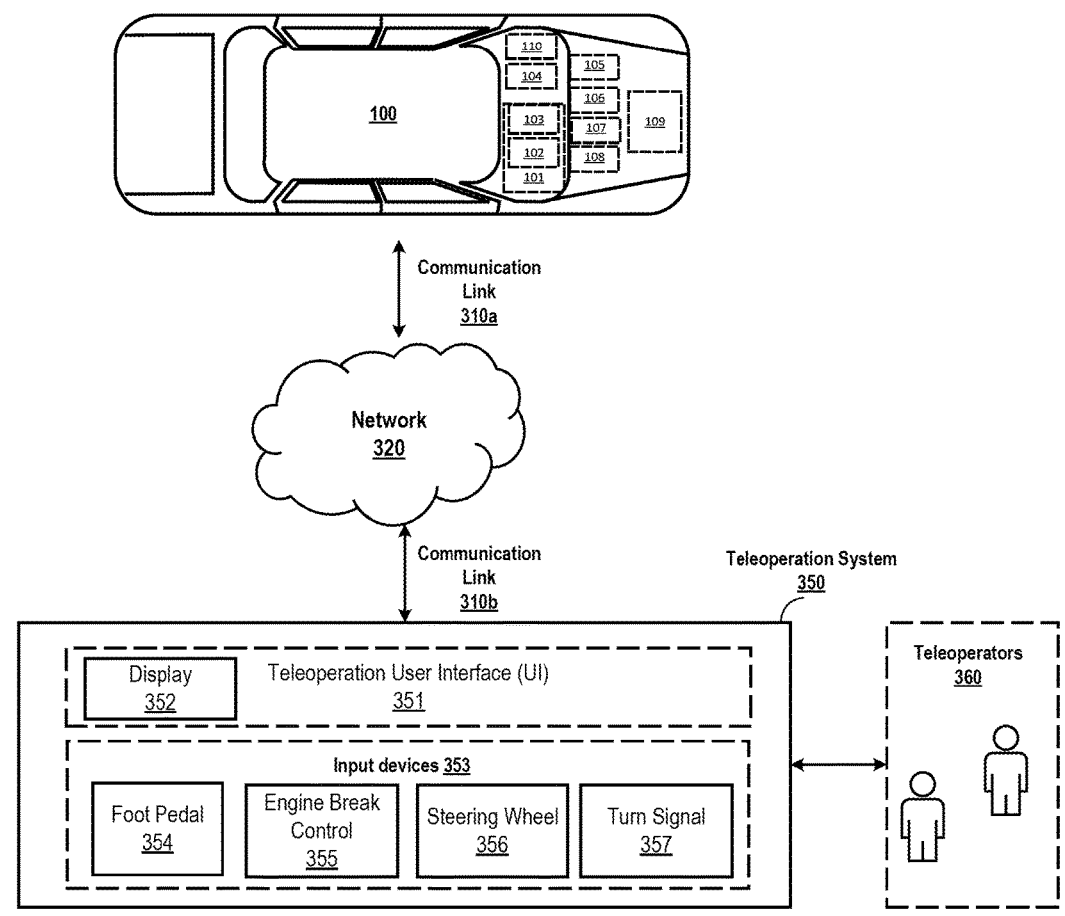
FIG. 3 shows an example system for controlling an autonomous vehicle through teleoperations, according to various embodiments of the present disclosure.

Referring now to FIG. 3, an example implementation of the disclosed methods for controlling the autonomous vehicle 100 through teleoperations based on a speed limiter is depicted, in accordance with various embodiments of the present disclosure. One or more autonomous vehicles 100 may be communicatively connected to a teleoperation system 350 through, e.g., a network 320 and communication links, e.g., 310a and 310b. A teleoperation system 350 may be located in the autonomous vehicle 100 or in a remote location, for example, at least 1, 2, 3, 4, 5, 10, 20, 30, 40, 50, 100, 200, 300, 400, 500, 600, 700, 900, or 1000 kilometers away from the autonomous vehicle 100.

The autonomous vehicle 100 may operate autonomously until the autonomous vehicle 100 encounters a teleoperation event, for which a teleoperations system 350 may intervene in operation of a planner of the autonomous vehicle 100. For example, the autonomous vehicle 100 may have a hardware or software failure or fault associated with one or more components of the autonomous vehicle 100. Due in part to the unpredictable nature of this type of event, the teleoperations system 350 may remotely direct the autonomous vehicle 100 via one or more communication networks 320 and communication links, e.g., 310a and 310b. In some embodiments, the communication link 310a or 310b may include a wireless communication link (e.g., via a radio frequency ("RF") signal, such as WiFi or Bluetooth®, including BLE, or the like).

According to various embodiments, upon encountering a teleoperation event, the autonomous vehicle 100 may send a teleoperation request to the teleoperation system 350. When the teleoperation request arrives at the teleoperation system 350, the teleoperation system 350 may place the teleoperation request in a queue to allocate an available teleoperator 360 (e.g., human teleoperator).

When the allocated teleoperator 360 becomes available, the teleoperation request is presented on a teleoperation interface to the teleoperator. The teleoperator may enter a teleoperation input containing, e.g., a steering wheel angle and/or throttle pedal/brake commands through the teleoperation system that is in response to a teleoperation event. According to various embodiments, the teleoperation input may include a throttle control input. The teleoperation system 350 may transmit the teleoperation input to a speed limiter 108 of the autonomous vehicle 100, e.g., through a wireless communication link.

According to various embodiments, one or more of the teleoperators 360 may not be human. For example, they may be computer systems leveraging artificial intelligence (AI), machine learning, and/or other decision-making strategies. As shown in FIG. 3, the teleoperator 360 may interact with one or more autonomous vehicles 100 via a teleoperation user interface 351. In some embodiments, the teleoperation user interface 351 may render to the teleoperator 360 what the autonomous vehicle 100 has perceived or is perceiving. The rendering may be based on real sensor signals or based on simulations. In some implementations, the teleoperation user interface 351 may be replaced by an automatic intervention process that makes any decisions on behalf of the teleoperator 360.

The teleoperation interface 351 may include one or more displays 352 configured to provide the teleoperator 360 with data related to operation of the autonomous vehicle 100, a subset of a fleet of autonomous vehicles 100, and/or the fleet of autonomous vehicles 100. For example, the display(s) 352 may be configured to show data related to real time information about the autonomous vehicle 100, such as sensor signals received from the autonomous vehicles 100, data related to the road condition, and/or the like. The real information may include data from other resources (e.g., a database, a server). Such data may include, e.g., road networks, maps, weather, and traffics.

In addition, the teleoperation interface 351 may also include a teleoperator input device 353 configured to allow the teleoperator 360 to provide information to one or more of the autonomous vehicles 100, for example, in the form of teleoperation input providing guidance to the autonomous vehicles 100. The teleoperator input devices 353 may include one or more of a touch-sensitive screen, a stylus, a mouse, a dial, a keypad, a joystick, a gesture-input system configured to translate gestures performed by the teleoperator 360 into input commands for the teleoperation interface 351, and/or other input mechanisms (inertial/floating sensors, etc.), As explained in more detail herein, the teleoperations system 360 may provide one or more of the autonomous vehicles 100 with guidance to avoid, maneuver around, or pass through events or road conditions.

In some embodiments, the input devices 353 may include controlling devices that mimic direct control in a vehicle by a driver sitting therein, such as a foot pedal 354 for controlling throttles and/or brakes, an engine break control 355 for powering on or off the engine, a steering wheel 356, and a turn signal control 357. In some embodiments, a teleoperator's input through the input devices 353 will be combined and synthesized by the teleoperation system 350 and transmitted to a receiver 104 of the autonomous vehicle 100 via one or more communication networks 320 and communication links, e.g., 310a and 310b.

Referring now to FIG. 4, an example method 400 for controlling the autonomous vehicle 100 through teleoperations based on a speed limiter is depicted, in accordance with various embodiments of the present disclosure.

At 405, the method 400 may include receiving, at the autonomous vehicle 100, a teleoperation input from a teleoperation system. As described above, the teleoperation system may include one or more teleoperators. The teleoperators may be human teleoperators located at a remote location, such as a teleoperations center. However, the teleoperators can also be non-human, such as a computer system. As an example, the computer system may employ artificial intelligence (AI), machine learning, and/or other decision-making strategies. The teleoperation system may communicate with the autonomous vehicle 100 via one or more communication networks and communication links. According to various embodiments, the communication link may include a wireless communication link (e.g., via a radio frequency ("RF") signal, such as WiFi or Bluetooth®, including BLE, or the like).

The teleoperation system may include a teleoperation user interface and one or more input devices to allow a teleoperator to enter guidance (e.g., control commands) for the autonomous vehicle 100. For example, the teleoperation system may include one or more visualization units (e.g., displays). The visualization units may be configured to show data related to real time information about the autonomous vehicle, such as sensor signals received from the autonomous vehicles 100, data related to the road condition, and/or the like. In some embodiments, the teleoperation input is entered by a human teleoperator. In some embodiments, the method may include presenting visualization data that may include the real time information of the autonomous vehicle 100 on the display to enable the teleoperator to determine whether to intervene in operation of a planner of the autonomous vehicle 100. According to various embodiments, the teleoperation system may implement a teleoperator's guidance for the autonomous vehicle 100 through directly operating a steering wheel, throttle (acceleration) pedal, and/or brake (deceleration) pedal, through a teleoperation input transmitted to the autonomous vehicle 100.

The teleoperation input may include a throttle control input for remotely controlling the speed of the autonomous vehicle 100. Such a throttle control input may be in response to a teleoperation event triggered by a hardware or software failure or fault or an event/road condition associated with at least a portion of an existing trajectory of the autonomous vehicle 100. In some embodiments, the teleoperation input may provide guidance, including causing the autonomous vehicle 100 to ignore or avoid the event or road condition (e.g., in an accident zone). The teleoperation input may include one or more commands to change a throttle or brake position and/or alter the steering angle of the autonomous vehicle 100. In some embodiments, the teleoperation input may include a throttle control input from the teleoperator to increase the speed of the autonomous vehicle 100.

At 410, the method 400 may include determining the speed of the autonomous vehicle 100. For example, the speed of the autonomous vehicle 100 may be determined based on data from a speedometer or an inertial measurement unit (IMU). In the event of a hardware or software failure or fault, the speedometer is generally more reliable. Accordingly, according to various embodiments, the method 400 may include determining the speed of the autonomous vehicle 100 based on signals from the speedometer.

At 415, the method 400 may include determining if the speed of the autonomous vehicle 100 has reached a threshold speed below a speed limit. As mentioned above, the speed limit and the threshold speed may be predetermined. For example, a predetermined speed limit can be 20 to 50 mph (e.g., 20 mph, 25 mph, 30 mph, 35 mph, 40 mph, 45 mph, 50 mph). A threshold speed may be a speed that is about 2 to 10 mph (e.g., 2 mph, 3 mph, 4 mph, 5 mph, 6 mph, 7 mph, 8 mph, 9 mph, 10 mph) below the predetermined speed limit. The threshold speed provides a buffer between the current speed of the autonomous vehicle 100 and the predetermined speed limit, such that the rate of acceleration of the autonomous vehicle 100 can be preemptively reduced to decrease the chance of going over the predetermined speed limit.

At 420, when the speed limiter determines that the speed of the autonomous vehicle 100 has reached the threshold speed, it will start to regulate a throttle level to the engine to reduce the rate of acceleration of the autonomous vehicle 100. For example, for a predetermined speed limit of 40 mph and a threshold speed of 30 mph, the speed limiter will start to regulate a throttle level to the engine when the speed of the autonomous vehicle 100 reaches about 30 mph. In regulating the throttle level to the engine, the speed limiter will reduce the effect of the throttle control input from the remote teleoperation system to a suitable throttle level, such that the acceleration rate of the speed of the autonomous vehicle is reduced. According to various embodiments, a suitable throttle level is at least 10%, at least 20%, at least 30%, at least 40%, at least 50%, at least 60%, at least 70%, at least 90%, or at least 95% of the normal throttle level associated with the throttle control input.

According to various embodiments, the speed limiter may reduce the effect of the throttle control input from the teleoperation system without involvement from cruise control. Unlike the cruise control that relies on a fully functioned feedback loop to maintain the speed of the autonomous vehicle 100, e.g., by reducing the speed of the autonomous vehicle 100 when the speed exceeds a predetermined speed limit. The speed limiter does not actively reduce the speed of the autonomous vehicle 100. Instead, it reduces the effect of the throttle control input, such that an effective output of the throttle control input is reduced to, e.g., 5%, 10%, 15%, 20%, 25%, 30%, 35%, 40%, 45%, 50%, 55%, 60%, 65%, 70%, 75%, 80%, 85%, 90%, or 95% of the regular throttle level associated with the throttle control input.

Figure 5:
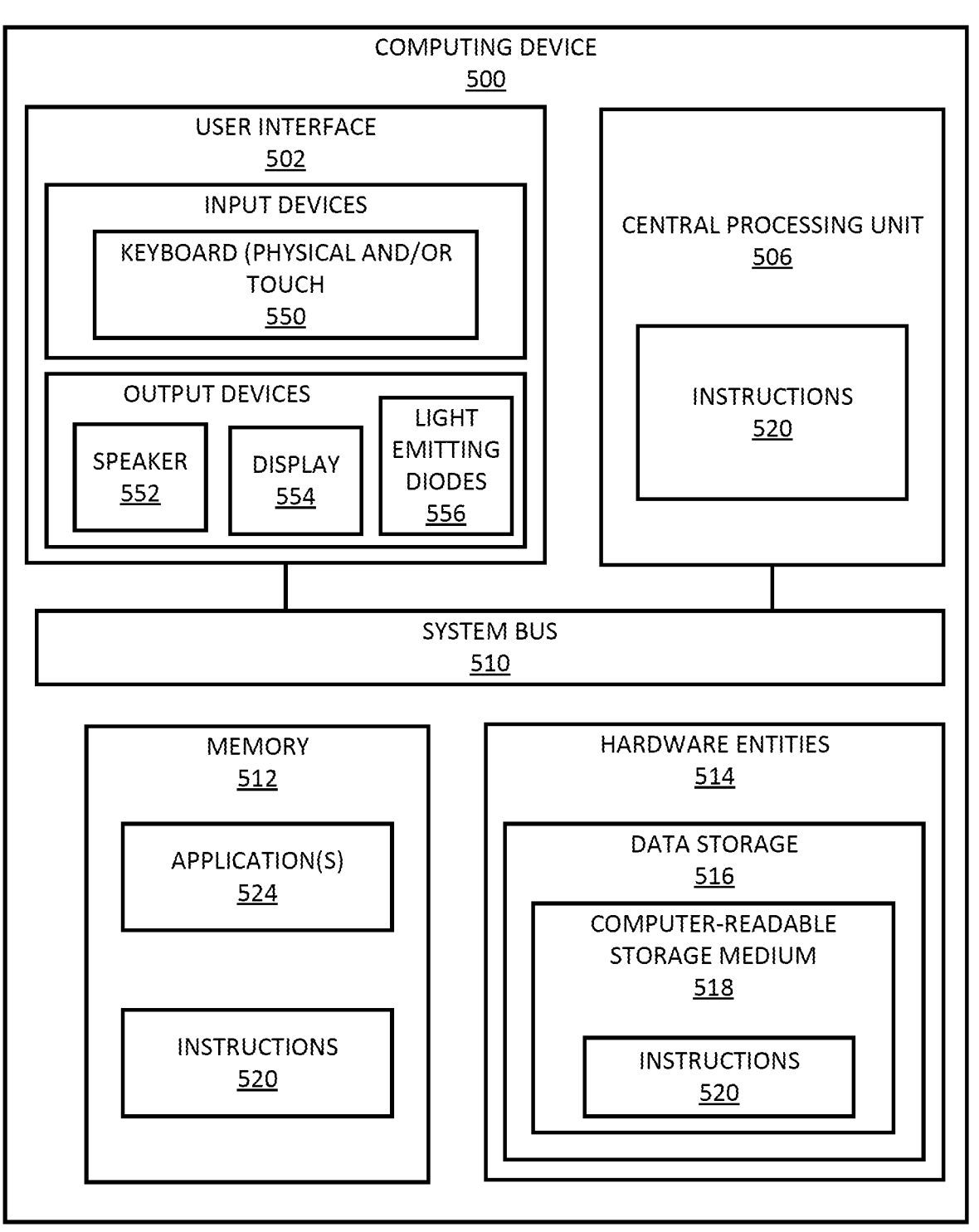
FIG. 5 shows example elements of a computing device, according to various embodiments of the present disclosure.

Referring now to FIG. 5, an illustration of an example architecture for a computing device 500 is provided. The main computing system 210 or the secondary controlling system 220 of FIG. 1 may be the same as or similar to computing device 500. As such, the discussion of computing device 500 is sufficient for understanding the main computing system 210 or the secondary controlling system 220 of FIG. 1, for example.

Computing device 500 may include more or fewer components than those shown in FIG. 1. The hardware architecture of FIG. 5 represents one example implementation of a representative computing device configured to one or more methods and means for controlling the autonomous vehicle

100 in response to an abnormal condition of the autonomous vehicle 100, as described herein. As such, the computing device 500 of FIG. 5 implements at least a portion of the method(s) described herein (for example, method 300 of FIG. 3 and/or method 400 of FIG. 4).

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices and output devices, which facilitate user-software interactions for controlling operations of the computing device 500. The input devices may include, but are not limited to, a physical and/or touch keyboard 550. The input devices can be connected to the computing device 500 via a wired or wireless connection (e.g., a Bluetooth® connection). The output devices may include, but are not limited to, a speaker 552, a display 554, and/or light emitting diodes 556.

At least some of the hardware entities 514 perform actions involving access to and use of memory 512, which can be a Random Access Memory (RAM), a disk driver and/or a Compact Disc Read Only Memory (CD-ROM), among other suitable memory types. Hardware entities 514 can include a data storage 516 comprising a computer-readable storage medium 518 on which is stored one or more sets of instructions 520 (e.g., programming instructions such as, but not limited to, software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media," as used here, refers to a single medium or multiple media (e.g., a centralized or distributed database, and/or associated caches and servers) that store the one or more sets of instructions 520. The term "machine-readable media," as used here, also refers to any medium that is capable of storing, encoding or carrying a set of instructions 520 for execution by the computing device 500 and that cause the computing device 500 to perform any one or more of the methodologies of the present disclosure.

Figure 6:
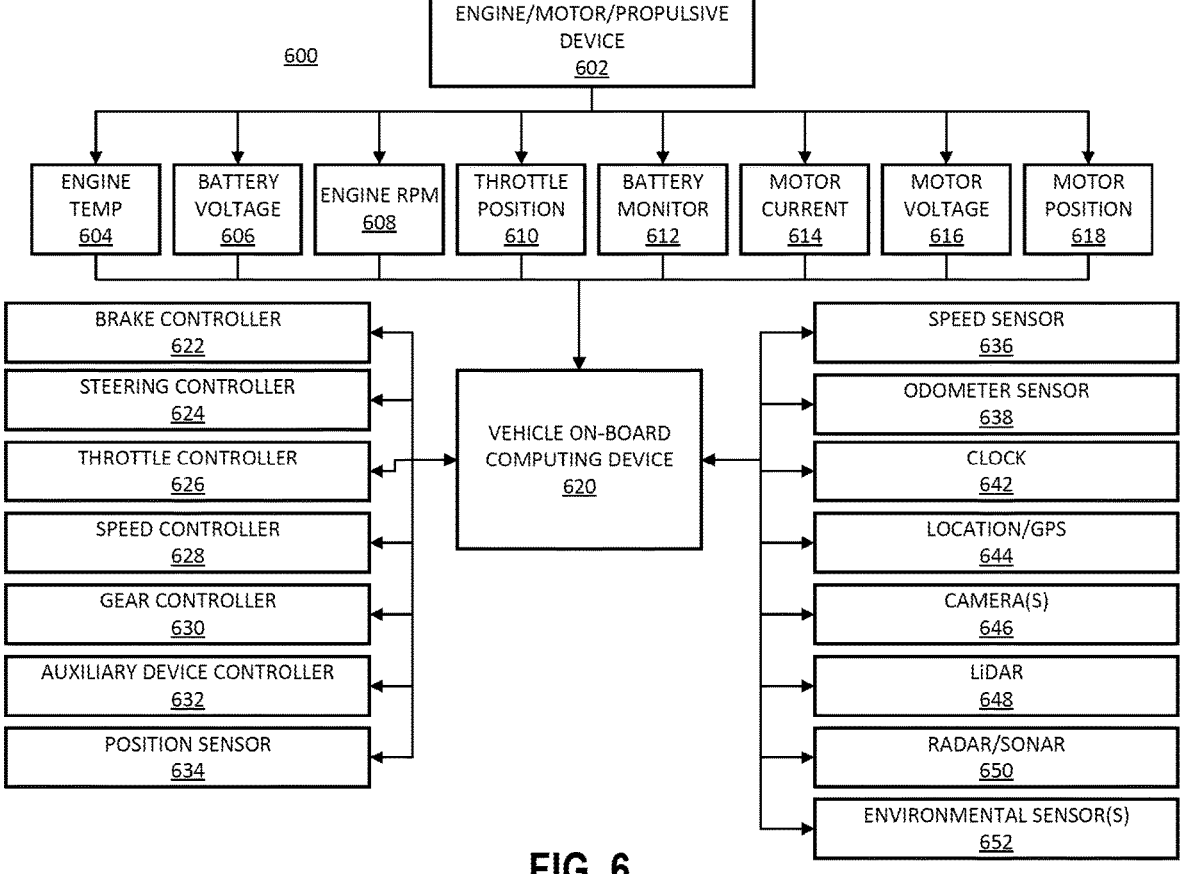
FIG. 6 shows an example architecture of a vehicle, according to various embodiments of the present disclosure.

Referring now to FIG. 6, an example vehicle system architecture 600 for a vehicle is provided, in accordance with various embodiments of the present disclosure.

The autonomous vehicle 100 of FIG. 1 can have the same or similar system architecture as shown in FIG. 6. Thus, the following discussion of vehicle system architecture 600 is sufficient for understanding the autonomous vehicle 100 of FIG. 1.

As shown in FIG. 6, the vehicle system architecture 600 includes an engine, motor or propulsive device (e.g., a thruster) 602 and various sensors 604-618 for measuring various parameters of the vehicle system architecture 600. In gas-powered or hybrid vehicles having a fuel-powered engine, the sensors 604-618 may include, for example, an engine temperature sensor 604, a battery voltage sensor 606, an engine Rotations Per Minute (RPM) sensor 608, and/or a throttle position sensor 610. If the vehicle is an electric or hybrid vehicle, then the vehicle may have an electric motor, and accordingly will have sensors such as a battery monitoring system 612 (to measure current, voltage and/or temperature of the battery), motor current 614 and voltage 616 sensors, and motor position sensors such as resolvers and encoders 618.

Operational parameter sensors that are common to both types of vehicles include, for example, a position sensor 634, such as an accelerometer, gyroscope and/or inertial measurement unit; a speed sensor 636; and/or an odometer sensor 638. The vehicle system architecture 600 also may have a clock 642 that the system uses to determine vehicle time during operation. The clock 642 may be encoded into the vehicle onboard computing device 620. It may be a separate device, or multiple clocks may be available.

The vehicle system architecture 600 also may include various sensors that operate to gather information about the environment in which the vehicle is traveling. These sensors may include, for example, a location sensor 644 (for example, a Global Positioning System (GPS) device); object detection sensors such as one or more cameras 646; a LiDAR sensor system 648; and/or a radar and/or a sonar system 650. The sensors also may include environmental sensors 652, such as a precipitation sensor and/or ambient temperature sensor. The object detection sensors may enable the vehicle system architecture 600 to detect objects that are within a given distance range of the vehicle 600 in any direction, while the environmental sensors 652 collect data about environmental conditions within the vehicle's area of travel.

During operations, information is communicated from the sensors to an onboard computing device 620. The onboard computing device 620 may be configured to analyze the data captured by the sensors and/or data received from data providers, and may be configured to optionally control operations of the vehicle system architecture 600 based on the results of the analysis. For example, the onboard computing device 620 may be configured to control: braking via a brake controller 622; direction via a steering controller 624; speed and acceleration via a throttle controller 626 (in a gas-powered vehicle) or a motor speed controller 628 (such as a current level controller in an electric vehicle); a differential gear controller 630 (in vehicles with transmissions); and/or other controllers.

Geographic location information may be communicated from the location sensor 644 to the onboard computing device 620, which may then access a map of the environment that corresponds to the location information to determine known fixed features of the environment such as streets, buildings, stop signs and/or stop/go signals. Captured images from the cameras 646 and/or object detection information captured from sensors such as LiDAR 648 are communicated from those sensors to the onboard computing device 620. The object detection information and/or captured images are processed by the onboard computing device 620 to detect objects in proximity to the vehicle. Any known or to be known technique for making an object detection based on sensor data and/or captured images may be used in the embodiments disclosed in this document.

The present disclosure is not to be limited in scope by the specific embodiments described herein. Indeed, various modifications of the invention in addition to those described herein will become apparent to those skilled in the art from the foregoing description and the accompanying figures. Such modifications are intended to fall within the scope of the appended claims.

What is claimed is:

1. A method of controlling an autonomous vehicle, comprising:

receiving, at the autonomous vehicle, a teleoperation input from a teleoperation system, wherein the teleoperation input comprises a throttle control input for remotely controlling the autonomous vehicle, and wherein the throttle control input includes a throttle level requested by a teleoperator; and using a processor:

determining the speed of the autonomous vehicle;

determining if the speed of the autonomous vehicle has reached a threshold speed below a speed limit; and upon determining that the speed of the autonomous vehicle has reached the threshold speed, regulating a throttle level of an engine for reducing effect of the throttle control input from the teleoperation system by:

determining a suitable throttle level as a function of the throttle level associated with the throttle control input, wherein the suitable throttle level is different than the threshold speed and different than the throttle level of the teleoperation input; and generating a throttle control request including the suitable throttle level;

wherein reducing the effect of the throttle control input from the teleoperation system is independent of cruise control.

2. The method of claim 1, comprising determining the speed of the autonomous vehicle by a speedometer.

3. The method of claim 1, wherein the autonomous vehicle has a failed inertial measurement unit (IMU).

4. The method of claim 1, wherein the threshold speed is a speed that is 5 mph to 10 mph below the speed limit.

5. The method of claim 1, wherein the speed limit is from 30 mph to 40 mph.

6. The method of claim 1, wherein the teleoperation input is entered by a teleoperator through the remote teleoperation system.

7. The method of claim 6, wherein the teleoperation input is entered by the teleoperator through a throttle control pedal.

8. The method of claim 1, wherein the step of receiving the teleoperation input is in response to a teleoperation event.

9. The method of claim 1, wherein the teleoperation input comprises a brake pedal input or an engine brake input.

10. A system for controlling an autonomous vehicle, comprising:

a teleoperation receiver, configured to receive a teleoperation input from a remote teleoperation system, wherein the teleoperation input comprises a throttle control input for remotely controlling the autonomous vehicle; and a processor, configured to:

determine the speed of the autonomous vehicle;

determine if the speed of the autonomous vehicle has reached a threshold speed below a speed limit; and upon determining that the speed of the autonomous vehicle has reached the threshold speed, regulating a throttle level of an engine to reduce effect of the throttle control input from the remote teleoperation system, by:

determining a suitable throttle level as a function of the throttle level associated with the throttle control input, wherein the suitable throttle level is different than the threshold speed and different than the throttle level of the teleoperation input; and generating a throttle control request including the suitable throttle level;

wherein reducing the effect of the throttle control input from the teleoperation system is independent of cruise control.

11. The system of claim 10, wherein the processor is configured to determine the speed of the autonomous vehicle by a speedometer.

12. The system of claim 10, wherein the autonomous vehicle has a failed inertial measurement unit (IMU).

13. The system of claim 10, wherein the threshold speed is a speed that is 5 mph to 10 mph below the speed limit.

14. The system of claim 10, wherein the speed limit is from 30 mph to 40 mph.

15. The system of claim 10, wherein the teleoperation input is entered by a teleoperator through the remote teleoperation system.

16. The system of claim 15, wherein the teleoperation input is entered by the teleoperator through a throttle control pedal.

17. The system of claim 10, wherein the step of receiving the teleoperation input is in response to a teleoperation event.

18. The system of claim 10, wherein the teleoperation input comprises a brake pedal input or an engine brake input.

\*    \*    \*    \*    \*